(12) United States Patent
Crosby et al.

(10) Patent No.: US 9,400,661 B2
(45) Date of Patent: Jul. 26, 2016

(54) EMBEDDED USER INTERFACE

(75) Inventors: Matthew N. Crosby, Vashon, WA (US); Timothy W. Kukulski, Oakland, CA (US); Vivek Hebbar, Sunnyvale, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1440 days.

(21) Appl. No.: 12/040,411

(22) Filed: Feb. 29, 2008

(65) Prior Publication Data

US 2014/0033227 A1 Jan. 30, 2014

(51) Int. Cl.
*G06F 9/54* (2006.01)
*G06F 9/44* (2006.01)

(52) U.S. Cl.
CPC .............. *G06F 9/4445* (2013.01); *G06F 9/547* (2013.01)

(58) Field of Classification Search
CPC ....... G06F 13/00; G06F 9/4445; G06F 9/547; G06F 8/00
See application file for complete search history.

(56) References Cited

U.S. PATENT DOCUMENTS

| | | | |
|---|---|---|---|
| 5,552,806 A | 9/1996 | Lenchik | |
| 5,600,780 A | 2/1997 | Hiraga et al. | |
| 5,838,315 A | 11/1998 | Craycroft et al. | |
| 5,907,326 A | 5/1999 | Atkin et al. | |
| 6,100,885 A | 8/2000 | Donnelly et al. | |
| 6,275,225 B1 | 8/2001 | Rangarajan et al. | |
| 6,342,907 B1 | 1/2002 | Petty et al. | |
| 6,559,871 B1 | 5/2003 | Brozowski et al. | |
| 6,795,851 B1 * | 9/2004 | Noy | 709/218 |
| 7,340,716 B1 | 3/2008 | Chansler | |
| 2005/0188007 A1 * | 8/2005 | Warner et al. | 709/203 |
| 2006/0271637 A1 * | 11/2006 | McKeon | H04L 67/08 709/217 |
| 2007/0005727 A1 * | 1/2007 | Edwards et al. | 709/218 |
| 2007/0180116 A1 * | 8/2007 | Kim et al. | 709/226 |
| 2008/0040371 A1 * | 2/2008 | Bayyapu et al. | 707/101 |
| 2009/0193434 A1 * | 7/2009 | Rivard et al. | 719/315 |

OTHER PUBLICATIONS

Juha Leppilahti, Remote UI protocols for home environment, 7 pages, Mar. 5, 2007.*
Tom Jordahl, Blaze DS, Feb. 12, 2007, Adobe Systems, Inc., pp. All.*
"Class Java.Util.Resource Bundle: Public Abstract Class Resource Bundle Extends Object", [Online]. Retrieved from the Internet: <URL:mk:@msitstore:c:\program%20file\microsoft%20Visual%.../java.util.resourcebundle.htm>, (Nov. 8, 1999), 3 pgs.
Applecare Knowledge Base Archive, "Mac OS 8: Appearance Information", [Online]. Retrieved from the Internet: <URL:http://docs.info.apple.com/article.html?artnum=24453>, (May 14, 1999), 2 pgs.

(Continued)

*Primary Examiner* — Syed Roni
(74) *Attorney, Agent, or Firm* — Shook, Hardy & Bacon, L.L.P.

(57) ABSTRACT

A system to provide embedded user interface (UI) may comprise a request collector to receive a request directed at a host application from a user interface (UI), a response collector to receive a response from the host application, and a response dispatcher to dispatch the response to the UI via the asynchronous communication channel. The request and the response may be communicated via an asynchronous communication channel.

19 Claims, 6 Drawing Sheets

(56) References Cited

OTHER PUBLICATIONS

Microsoft Windows 2000, "Internet Information Services Features", [Online]. Retrieved from the internet: <URL:http://www.microsoft.com/windows2000//server/evaluation/features/web.asp>, (Apr. 19, 1999), 8 pgs.

Sanna, Paul, et al., "Using Windows NT Workstation 4.0: Second Edition", *Que Corporation*, (1997), 442-444.

* cited by examiner

EMBEDDED USER INTERFACE

TECHNICAL FIELD

This application relates to system and method to provide an embedded user interface.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A user interface may include graphical, textual or auditory information that an application or operating system presents to a user so as to permit the user to provide input to the application or operating system User Interface (UI). A UI of a desktop application is typically tightly bound to data coming from the relevant desktop application.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
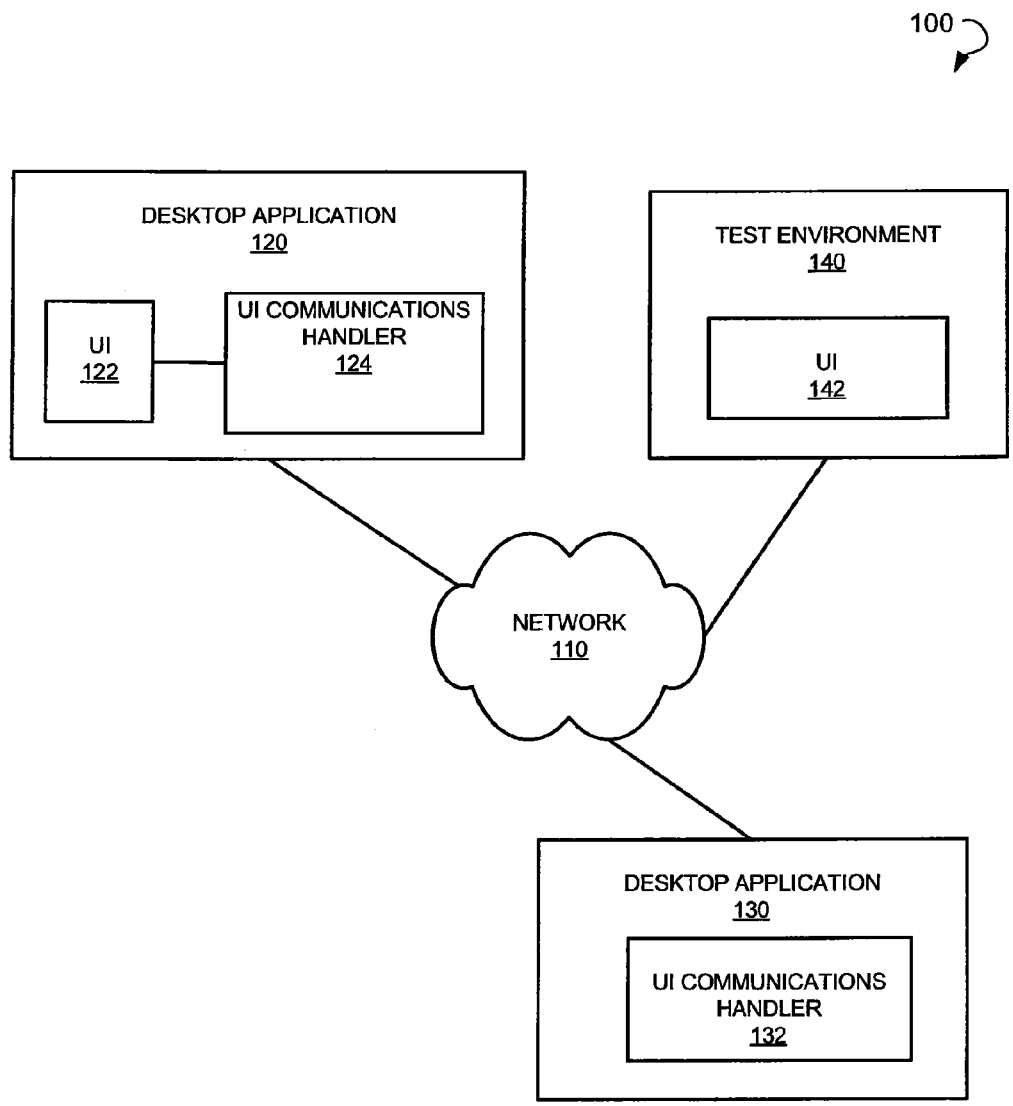
FIG. 1 shows a network environment within which method and system to provide an embedded UI may be implemented, in accordance with an example embodiment.

An embedded user interface (UI) is typically constructed with internal knowledge of whether it is to interact with a host software application in which it is embedded or with remotely located application software. An embedded UI may be configured such that communications are limited to a particular host application software. In order to permit a UI to be reusable, in one example embodiment, a UI may be decoupled from the desktop application that uses the UI by permitting asynchronous communication between the application and its UI. Asynchronous communication may be described as communication that does not require that all parties involved in the communication need to be present and available at the same time. Asynchronous communication may be accomplished, e.g., by queuing requests and generating and dispatching a response whenever a required resource becomes available.

Asynchronous communications channel may be implemented by providing a UI communications handler with the desktop application and by providing a UI module with a host communications module. A desktop application configured with a UI communications handler may be used as a host application with respect to the UI. The UI, in turn, may be now capable of communicating with any host application using a host communications module. Thus, a UI may now be agnostic to its own location with respect to the host application that uses it, such that one UI module may be embedded in a desktop application and may also be used by a desktop application that is located on the same machine but is part of a different process or by a desktop application that is located remotely (e.g., on a different machine) by virtue of the asynchronous communications channel.

This approach may be visualized by imagining running a mini web application inside a desktop application, which permits the desktop application to act as a remote host with respect to the associated UI module.

According to one example embodiment, a UI communications handler may be implemented utilizing Application Programming Interfaces (APIs) and protocols typically used by web applications. The UI communications handler may have different example implementations. One implementation, for example, may be to accommodate communication with a UI that is provided locally with respect to the host application. This implementation of the UI communications handler may be configured to utilize an external API to a media player (e.g. the ExternalInterface mechanism supported by FLASH®Player, in which a UI can communicate with the scripting environment of its host). Another example implementation of the UI communications handler may be to accommodate communication with a UI that is provided remotely with respect to the host application. This implementation of a UI communications handler may be configured to utilize a socket communication mechanism. A host application may be a desktop application or a web application. For example, the techniques described herein may be used when the host application is an instance of ADOBE® ACROBAT® software, a remotely hosted service or any web application.

According to one example embodiment, a UI communications handler may be implemented utilizing Application Programming Interfaces (APIs) and protocols typically used by web applications. The term "web application" refers to an application that may be accessed over a network, such as the Internet or an intranet, utilizing a web browser. The UI communications handler may have different example implementations. One implementation, for example, may be to accommodate communication with a UI that is provided locally with respect to the host application. This implementation of the UI communications handler may be configured to utilize an external API to a media player (e.g. the ExternalInterface mechanism supported by FLASH®Player, in which a UI can communicate with the scripting environment of its host). Another example implementation of the UI communications handler may be to accommodate communication with a UI that is provided remotely with respect to the host application. This implementation of a UI communications handler may be configured to utilize a socket communication mechanism. A host application may be a desktop application or a web application. For example, the techniques described herein may be used when the host application is an instance of ADOBE® ACROBAT® software, a remotely hosted service or any web application.

An example user interface may be implemented as a script that defines various UI elements, such as a file with a "swf" extension (an acronym for SHOCKWAVE® FLASH® file). Files with a "swf" extension will be referred to as SWF files or merely SWF. When a script that defines a UI is first invoked, in one example embodiment, a call is made to a UI communications handler provided with the host application to detect (e.g., based on the value of an associated environmental variable) whether the host application software is local or remote with respect to the UI. If the host application software is local, then the implementation of the communications handler based on the external API (e.g., ExternalInterface) is loaded. If it is determined that the host application software is remote with respect to the UI, then the implementation of the communications handler based on sockets is loaded. In this case, the communications handler opens a socket to the host using a predefined port. It will be noted that the host application may reside on a local or on a remote machine with respect to the UI. Subsequent communication between the UI and the host application utilizes the communications channel established on the first invocation of the UI.

In some example embodiments, the techniques described herein may be utilized beneficially to construct products that operate seamlessly when connected to or disconnected from the Internet. The techniques described herein may also be utilized as a code re-use mechanism. For example, code modules may be developed in a way that in some cases they may be embedded directly into a desktop application and in other cases deployed as part of a web application. For example, a tool may be developed that extracts and displays document properties. This tool may reside in a desktop application (displaying properties of a document that is being opened locally in the application) and also may reside on a search engine web page for providing document properties from search results.

The described methods and systems may, in an example embodiment, to be used to provide an embedded UI to test a UI of a content viewing application, where the content viewing application is using a UI script that is running inside another application. In some example embodiments, when no Internet connection is available, the UI may use a local instance of the application software until an Internet connection becomes available. Upon connecting to the Internet, the embedded UI may switch to communicating with a remote instance of the application. This approach may also be utilized in collaboration projects. The method may be implemented as a peer-to-peer (P2P) collaboration project where the participants' UIs engage in communication with their own, locally available applications, as well as other participant's host applications.

FIG. 1 is a schematic diagram showing a network environment 100 within which a system to provide embedded UI may be implemented, in accordance with an example embodiment. The network environment 100 may include a desktop application 120, a desktop application 130, and a test environment 140. The desktop application 120, the desktop application 130, and the test environment 140 may communicate with each other via a communications network 110. The communications network 110 may be a public network (e.g., the Internet, a wireless network, a public switched telephone network (PSTN), etc.) or a private network (e.g., LAN, WAN, Intranet, etc.).

As shown in FIG. 1, a UI 122 of the desktop application 120 is provided locally with respect to the desktop application 120. In some example embodiments, the UI 122 exists as a resource to the desktop application 120. For example, when a document generated by the desktop application 120 is displayed, the UI 122 may interact with the data model of the desktop application 120. The desktop application 120 is configured to communicate with the UI 122 via a UI communications handler 124. The communications handler 124 thus provides an abstraction layer between the desktop application 120 and the UI 122.

As a result of decoupling of a UI from an application that uses the UI, as mentioned above, the UI may be configured to be agnostic with respect to the location (e.g., host computer system) of the application that uses it. For example, the desktop application 130 may use the UI 122 embedded in the desktop application 120, utilizing the communications handler 132. In another scenario, a UI 142 residing at the test environment 140 may be tested utilizing the remotely located desktop application 120. In each of these scenarios, the binary for the UI 142 and for the UI 122 may identical. In another example (not shown) a UI that is identical to the UI 142 and the UI 122 may reside on any remote server system and communicate with, e.g., the desktop application 120. The UI, therefore, may be without regards as to whether it was embedded as a resource in a desktop application, running on the same machine but in a different process from the desktop application, running on a separate machine from the desktop application, or connected to application logic other than a desktop application (for example, to a web application backend).

Thus, example systems and methods are described to develop and provide a UI that is reusable in various software applications. For example, the UI 122 may be configured to provide some functionality (e.g., document search) while it is embedded in the desktop application 120. The UI 122 may also be used to provide the same functionality to the desktop application 130. In some embodiments, the UI 122 may be utilized as part of a web application running in a browser and communicating with the desktop application 120 via the network 110. As already mentioned above, the communications between a UI and a host application may occur using an asynchronous communication channel, as described herein with reference to FIG. 2.

Figure 2:
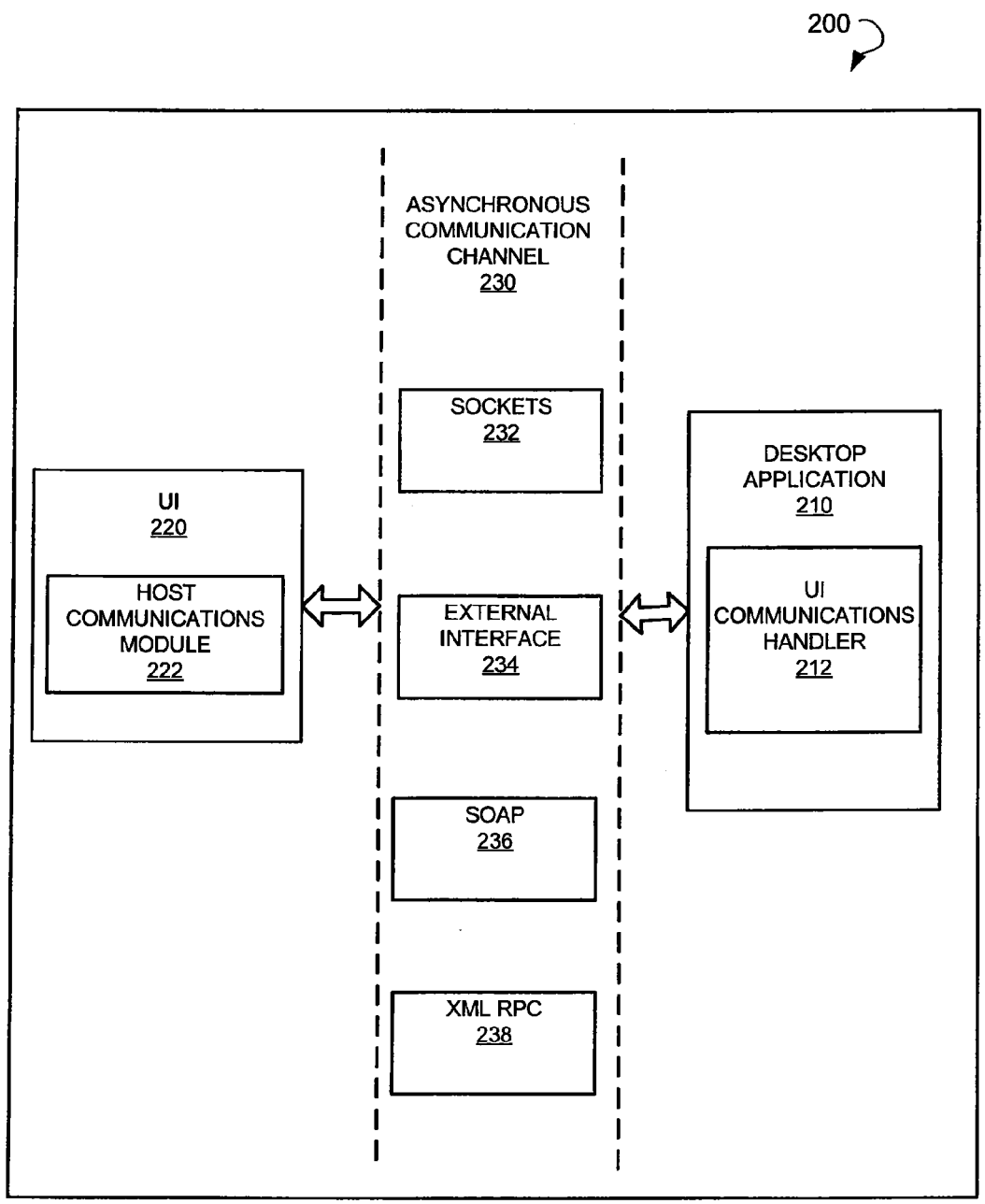
FIG. 2 shows an architecture of a system to provide an embedded UI, in accordance with an example embodiment.

FIG. 2 in it is a block diagram illustrating an example architecture 200 of a system and method to provide embedded UI. As shown in FIG. 2, the architecture 200 includes a UI 220 and a desktop application 210. The UI 220 may correspond to the UI 122 and desktop application 210 may correspond to the desktop application 120 described above with reference to the network environment 100. The communication between the UI 220 and a desktop application 210 is effectuated via an asynchronous communication channel 230 that may utilize, e.g., sockets 232, ExternalInterface 234, a Simple Object Access Protocol (SOAP) 236, an eXtensible Markup Language (XML) Remote Procedure Calls (RPC), as well as other asynchronous communications protocols.

As mentioned above, the desktop application 210 is capable of communicating with the UI 220 via the asynchronous communication channel 230 using the UI communication handler 212. The UI communication handler 212 may be implemented in accordance with a particular protocol used with respect to the asynchronous communications channel 230. For example, where the UI 220 is provided as a resource to the desktop application 210, the communications channel may use the ExternalInterface mechanism 234 provided by the FLASH®Player and supported by its embedded equivalent, a dynamic link library named "authplay.dll." Authplay.dll is a component of FLASH®. FLASH® allows designers and developers to integrate video, text, audio, and graphics in creating rich experiences for interactive marketing and presentations, e-learning, and application user interfaces. Where the communications channel between the UI 220 and the desktop application 210 uses ExternalInterface mechanism 234, the UI communication handler 212 may be implemented to use the ExternalInterface mechanism 234. The UI 220 includes a host communications module that permits the UI 220 to be agnostic to the location of the host application and permit communications with the host application regardless of the flavor of the asynchronous communications protocol utilized by the host application. The UI communication handler 212, on the other hand, may have different implementations depending on the asynchronous communications mechanism available to the host application.

In operation, according to one example embodiment, the UI 220 (e.g., implemented using ActionScript code) requests data from the desktop application 210 (e.g., from ADOBE® ACROBAT®) so it can display certain graphical elements. The entire request is first serialized into an XML message and then transmitted via the asynchronous communication channel 230 to the desktop application 210. The XML message is then queued by the UI communications handler 212 and then processed by the desktop application 210 in an idle loop. Specifically, the XML message is parsed by the desktop application 210 to identify any associated commands. The commands are executed, and, if a command in the XML message indicates that a response is required (e.g., the command is requesting a specific property), a response is generated and encoded as an XML string. The UI communications handler 212 dispatches the response via the asynchronous communications channel 230 to the UI 220, where the response is decoded and routed appropriately. An example UI communication handler may be described with reference to FIG. 3.

Figure 3:
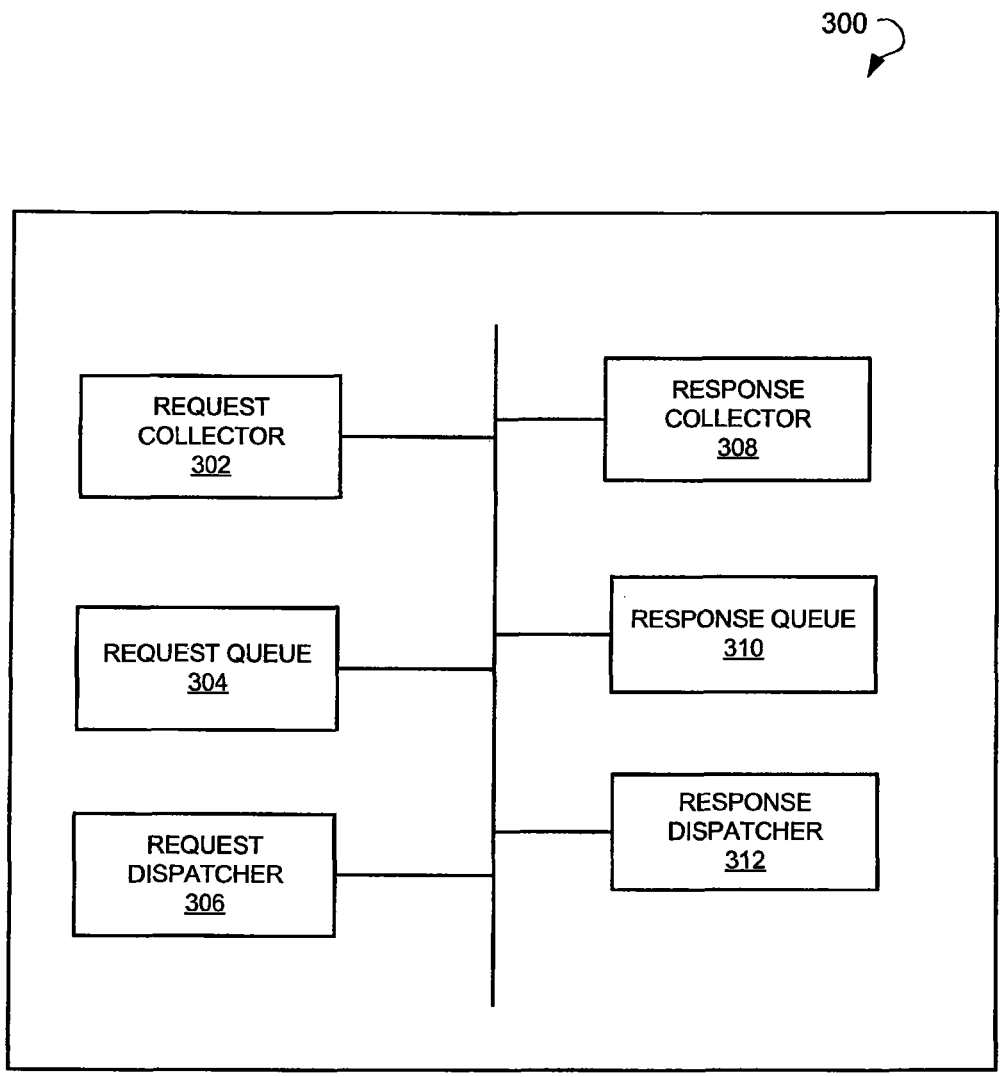
FIG. 3 is a block diagram illustrating a UI communications handler, in accordance with an example embodiment.

FIG. 3 is a block diagram illustrating an example UI communications handler 300, in accordance with an example embodiment. The UI communications handler 300 may include modules to handle requests from a UI (e.g., the UI 220 illustrated in FIG. 2) directed to a host application (e.g., the desktop application 210 illustrated in FIG. 2) and modules to handle responses from the host application to be dispatched to the UI. The modules to handle requests from a UI may include a request collector 302, a request queue 304, and a request dispatcher 306. The modules to handle responses from the host application may include a response collector 308, a response queue 310, and a response dispatcher 312.

In one example embodiment, the request collector 302 may be configured to receive requests from the UI directed at the host application. The request queue 304 may be configured to monitor the requests coming from the UI and the request dispatcher 306 may be configured to dispatch the request to the host application. The response collector 308 may be configured to receive responses from the host application, the response queue 310 may be configured to monitor the responses coming from the UI 220, and response dispatcher 308 may be configured to send responses received from the host application to the UI. Example operations performed by the UI communications handler 300 may be described with reference to FIG. 4.

Figure 4:
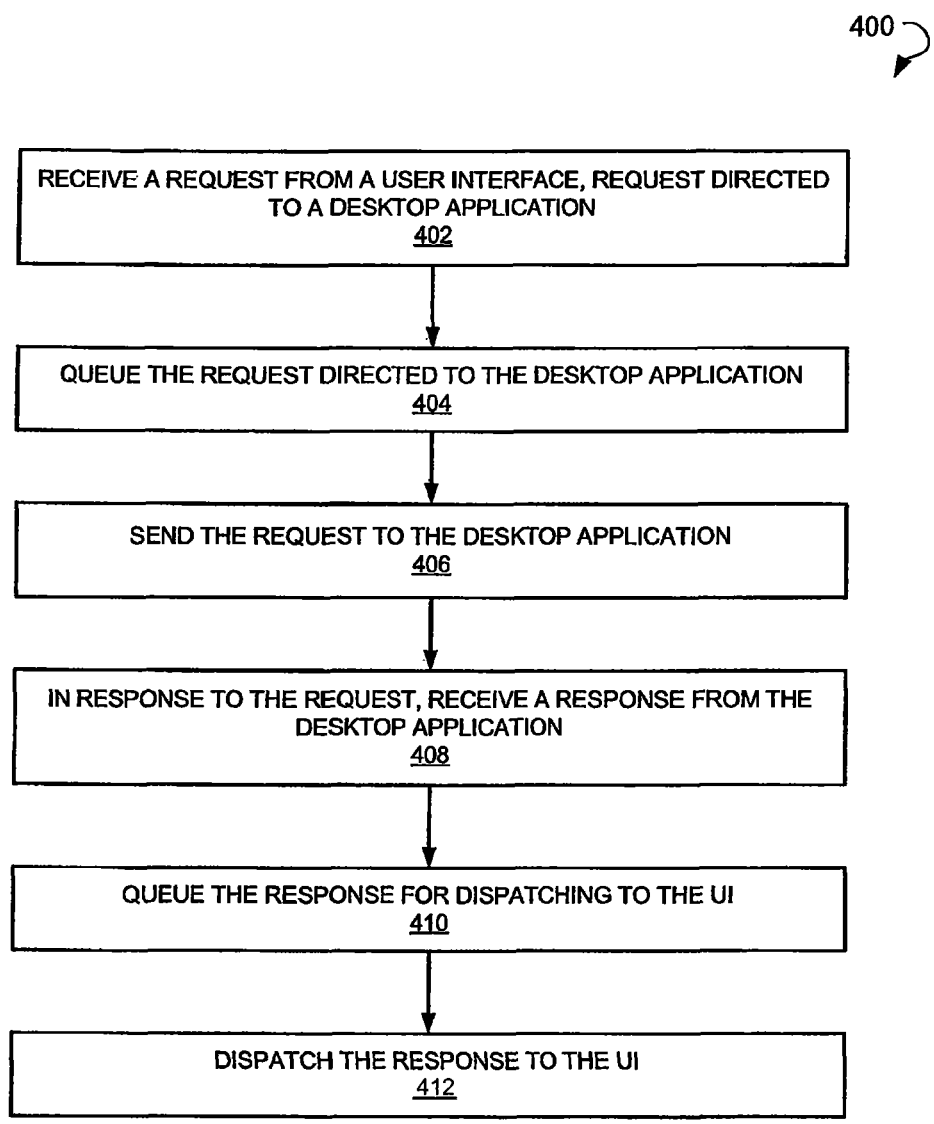
FIG. 4 is a flow chart illustrating a method to facilitate asynchronous communication between a UI and a host application, in accordance with an example embodiment.

FIG. 4 is a flow chart illustrating a method to facilitate asynchronous communication between a UI and a host application, in accordance with an example embodiment. The method 400 may be performed by processing logic that may comprise hardware (e.g., dedicated logic, programmable logic, microcode, etc.), software (e.g., run on a general-purpose computer system or a dedicated machine), or a combination of both. In one example embodiment, the processing logic resides at the UI communications handler illustrated in FIG. 3. The method 400 may be performed by the various modules discussed above with reference to FIG. 2 and FIG. 3. Each of these modules may comprise processing logic.

As shown in FIG. 4, the method 400 commences at operation 402 with the request collector 302 of the UI communications handler 300 receiving a request from a UI (e.g., the UI 220 of FIG. 2) directed at a host application (e.g., the desktop application 210 of FIG. 2).

Below is an example of how a UI (e.g., the UI 220 of FIG. 2) may request an object property to display in the UI.

```
<invoke name="GetProperty" returntype="xml">
<arguments>
<number>118</number>
<string>modDate</string>
</arguments>
</invoke>
```

In the example above, the number 118 identifies a particular object, and the string "modDate" names the property that the UI needs to display. In response to this request, the host application (e.g., the desktop application 210 of FIG. 2) may1 locate object 118, determine the value of the "modDate" property, and return it to the UI.

At operation 404, the request is queued in the request queue 304. The request is dispatched to the host application at operation 406.

The request is processed by the host application to generate a response. At operation 406, the response collector 308 receives the response from the host application. At operation 408, the response is queued in the response queue 310. The response dispatcher 312 dispatches the response to the UI via the asynchronous communications channel at operation 410. As explained above, a UI communications handler may be implemented to work with a particular asynchronous communications protocol. In some embodiments, two or more implementations of a UI communications handler may be provided with a host application such that the host application may utilize UIs that are accessible via different asynchronous communication channels. An example of selection an appropriate UI communications handler by the host application may be described with reference to FIG. 5.

Figure 5:
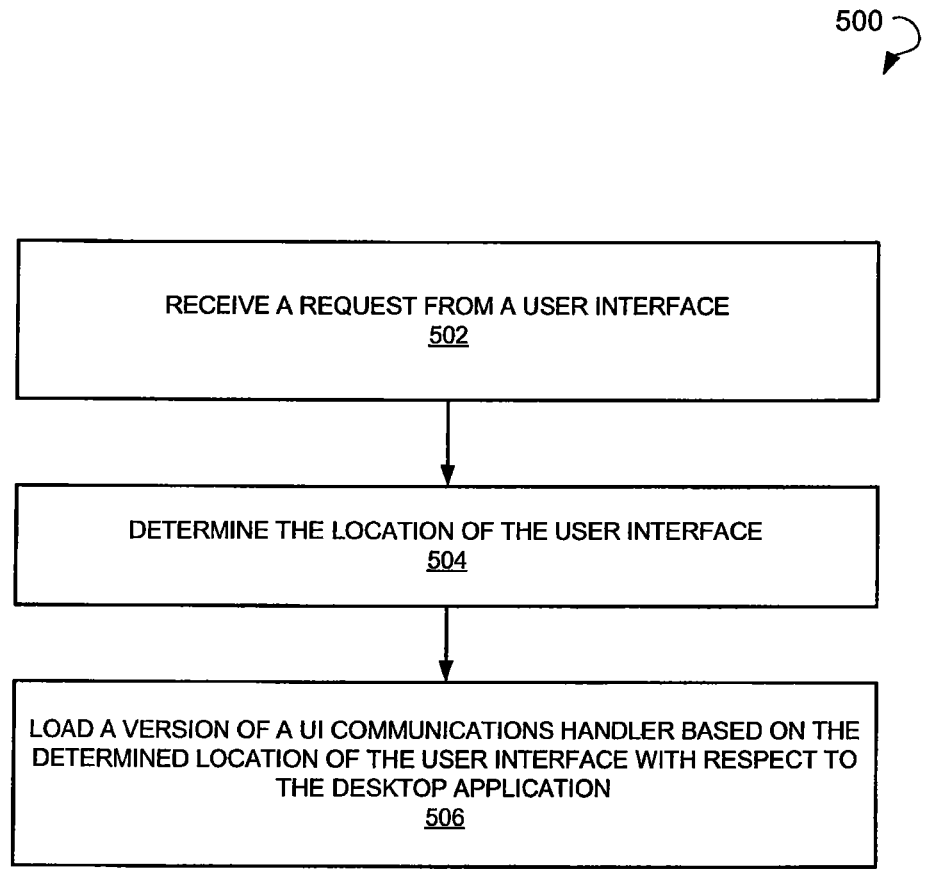
FIG. 5 is a flow chart illustrating a method to selectively load an implementation of a UI communications handler, in accordance with an example embodiment.

FIG. 5 is a flow chart illustrating a method to selectively load an implementation of a UI communications handler. The method 500 may be performed by processing logic that may comprise hardware (e.g., dedicated logic, programmable logic, microcode, etc.), software (e.g., run on a general-purpose computer system or a dedicated machine), or a combination of both. In one example embodiment, the processing logic resides at the UI communications handler illustrated in FIG. 3. The method 500 may be performed by the various modules discussed above with reference to FIG. 2 and FIG. 3. Each of these modules may comprise processing logic.

As shown in FIG. 5, at operation 502 a host application (e.g., the desktop application 210 illustrated in FIG. 2) receives a request from a UI (e.g., from the UI 220 illustrated in FIG. 2). At operation 504, the host application determines whether the UI is local or remote with respect to the host application and loads an appropriate implementation of the UI communications handler at operation 506. As discussed above, with reference to FIG. 2, a UI communication handler provided with a host desktop application may be implemented in accordance with a particular protocol used with respect to the asynchronous communications channel 230, e.g., one implementation of a UI communication handler may be provided to use ExternalInterface, while another implementation of a UI communication handler may provided to use sockets.

In one example embodiment, a UI may be started in different ways, depending on the associated environment. Where the UI is embedded in a desktop application, the desktop application directly loads and launches the UI. For example, the UI may consist of ActionScript code compiled into a SWF file and stored as a resource. The desktop application loads the SWF resource, instantiates an instance of the Flash Player and passes the SWF to it. In another example, where a UI is servicing a remote web application, the web application serves up an HTML file, which in turn contains a reference to the UI code. Using the same SWF as in the first example, the HTML code may include an <embed> tag that refers to the SWF file on the server. A web browser may load the HTML page, and then load the SWF file that, in turn, is provided to and executed by the Flash® Player browser plug-in.

Upon start-up, the host communications handler provided with the SWF obtains information describing the execution environment associated with the host application. Based on the environment, the host communications handler causes one of several available communication mechanisms to be instantiated. In the case where the UI (e.g., in the form of a SWF) is embedded in a desktop application, the communication mechanism may be the FLASH® Player ExternalInterface API. In the case where the UI is servicing a remote web application, the communication mechanism may be based on sockets. A UI communications handler configured to cooperate with the host communications module residing in the UI, in one example embodiment provides an abstract asynchronous API for communication between the UI executable and the host application. A UI therefore is agnostic to whether the asynchronous API for communication is built on top of EternalInterface, sockets, or some other binding. But being asynchronous, the API may be used in a manner similar to a web services API. Programming techniques used to build the client side of a web application could be used successfully with this API.

It will be noted, that while the embodiments of the method and system to provide embedded UI have been described with reference to a desktop application and to a UI implemented using ActiveScript, other embodiments of the method and system to provide embedded UI may be provided. For example, a host application may be a web application, and a UI may be implemented utilizing various other scripting and programming languages.

Figure 6:
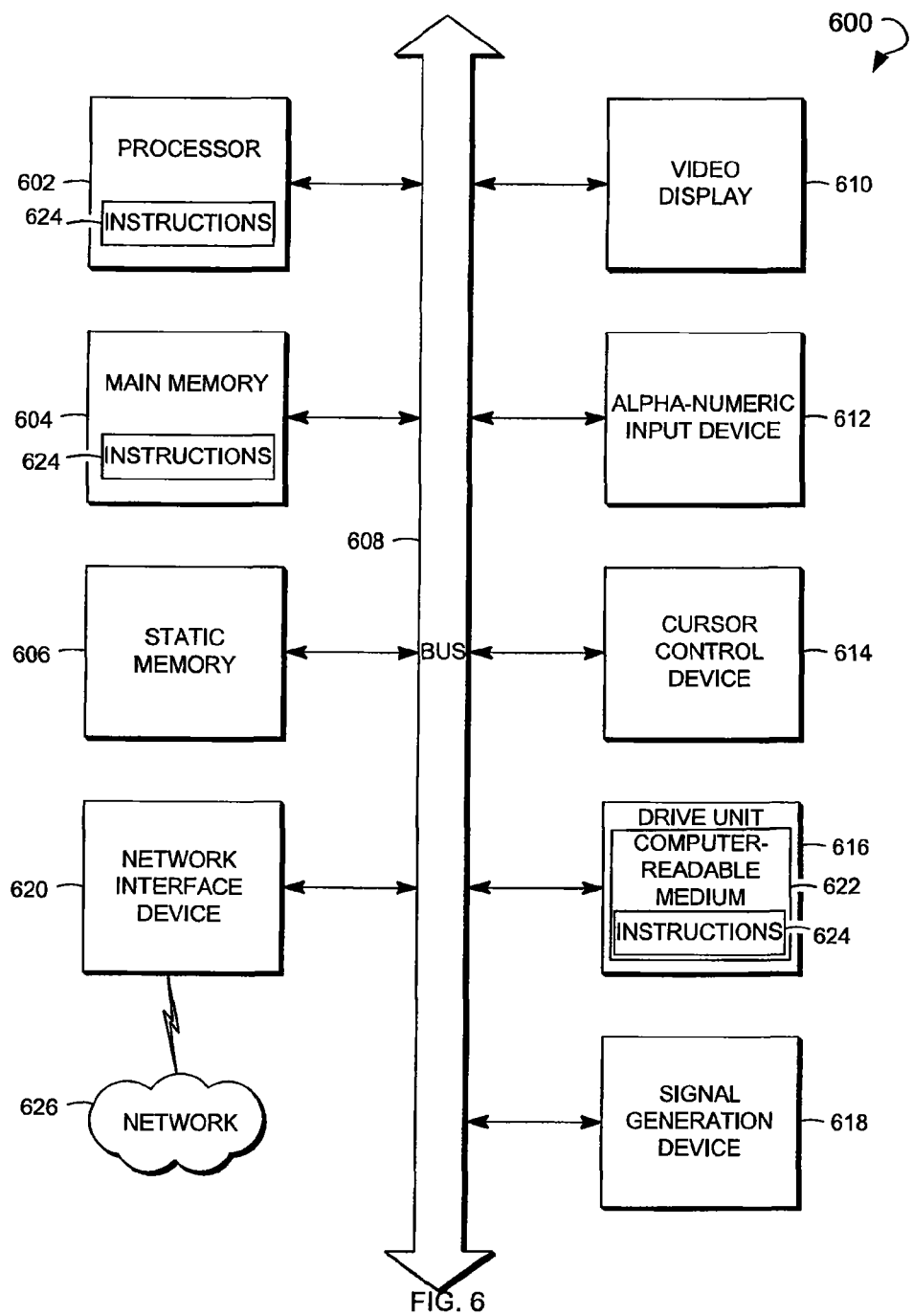
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example electronic form of a computer system 600 within which a set of instructions for causing the machine to perform any one or more of the methodologies discussed herein, may be executed in accordance with an example embodiment. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616 a signal generation device 618 (e.g., a speaker), and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604, and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A computer-implemented method for enabling communication between a host application and a user interface comprising:
   receiving, by the host application, a request from the user interface;
   in response to receiving the request, determining, by the host application, whether the user interface is local to the host application or remote from the host application;
   based on a result of the determining, selectively instantiating, by the host application, one of a local communication handler or a remote communication handler as a user interface communications handler for the host application, wherein the local communication handler accommodates local communication, via a first asynchronous communication channel, between the host application, and the user interface where the user interface is determined to be local to the host application, and the remote communication handler accommodates remote communication, via a second asynchronous communication channel, between the host application and the user interface where the user interface is determined to be remote from the host application, the first asynchronous communication channel and the second asynchronous communication channel being different from one another;
   generating, by the host application, a response to the request, independent of whether the user interface is determined to be local to the host application or remote from the host application; and
   transmitting the response to the user interface via the user interface communications handler.

2. The computer-implemented method of claim 1, wherein the user interface is remote from the host application, and wherein selectively instantiating one of the local communication handler or the remote communication handler comprises selectively instantiating the remote communication handler.

3. The computer-implemented method of claim 2, further comprising opening the second asynchronous communication channel associated with the remote communication handler, wherein the second asynchronous communication channel is based on sockets.

4. The computer-implemented method of claim 1, wherein the user interface is local to the host application, and wherein selectively instantiating one of the local communication handler or the remote communication handler comprises selectively instantiating the local communication handler.

5. The computer-implemented method of claim 4, further comprising opening the first asynchronous communication channel associated with the local communication handler wherein the first asynchronous communication channel is an External Interface.

6. The computer-implemented method of claim 1, wherein the host application is a desktop application.

7. The computer-implemented method of claim 6, wherein the desktop application is a content viewing application.

8. The computer-implemented method of claim 1, wherein the host application is a web application.

9. The computer-implemented method of claim 1, wherein the transmitting of the response to the user interface comprises queuing the response into a response collector of the user interface communication handler.

10. A system comprising:
    one or more processors;
    a memory coupled with the one or more processors, the memory including instructions that, when executed by the one or more processors, cause the system to implement:
    a host application that is to:
      receive a request from a user interface;
      in response to the request, determine whether the user interface is local to the host application or remote from the host application;
      based on a result of the determination, selectively instantiate a local communication handler or a remote communication handler as a user interface communications handler, wherein the local communication handler accommodates local communication, via a first asynchronous communication channel, between the host application and the user interface where the user interface is determined to be local to the host application, and the remote communication handler accommodates remote communication, via a second asynchronous communication channel, between the host application and the user interface where the user interface is determined to be remote from the host application;
      generate a response to the request, independent of whether the user interface is determined to be local to the host application or remote from the host application; and
      transmit the response to the user interface via the user interface communications handler.

11. The system of claim 10, wherein the host application is remote from the user interface, and, wherein to selectively instantiate the local communication handler or the remote communication handler is to selectively instantiate the remote communication handler.

12. The system of claim 11, wherein the system is further to: open the second asynchronous communication channel associated with the remote communication handler;
    the remote communication handler comprising:
      a request collector to receive a request directed at the host application from the user interface via the second asynchronous communication channel,
      a request dispatcher to communicate the request to the host application,
      a response collector to receive the response from the host application, and
      a response dispatcher to dispatch the response to the user interface via the second asynchronous communication channel, wherein the second asynchronous communication channel is based on sockets.

13. The system of claim 10, wherein the host application is located local to the user interface, and, wherein to selectively instantiate the local communication handler or the remote communication handler is to selectively instantiate the local communication handler.

14. The system of claim 13, wherein the instructions are further to cause the system to: open the first asynchronous communication channel associated with the local communication handler;
    the local communication handler comprising:
      a request collector to receive a request directed at the host application from the user interface via the first asynchronous communication channel,
      a request dispatcher to communicate the request to the host application, a response collector to receive the response from the host application, and a response dispatcher to dispatch the response to the user interface via the first asynchronous communication channel, wherein the first asynchronous communication channel is an external interface.

15. The system of claim 14, wherein the host application is a desktop application.

16. The system of claim 15, wherein the desktop application is a content viewing application.

17. The system of claim 10, wherein the host application is a web application.

18. The system of claim 10, comprising a response queue, wherein to transmit the response to the user interface via the user interface communications handler is to queue the response into a response collector of the local communication handler or the remote communication handler.

19. One or more machine-readable non-transitory storage media having instructions stored thereon, which, when executed by a processor of a computing device, provide the computing device with a host application to:

receive a request from a user interface;

in response to the request, determine whether the user interface is local to the host application or remote from the host application;

based on a result of the determination, selectively instantiate a local communication handler or a remote communication handler as a user interface communications handler, wherein the local communication handler accommodates local communication, via a first asynchronous communication channel, between the host application and the user interface, where the user interface is determined to be local to the host application, and the remote communication handler accommodates remote communication, via a second asynchronous communication channel, between the host application and the user interface, where the user interface is determined to be remote from the host application;

generate a response to the request, independent of whether the user interface is determined to be local to the host application or remote from the host application; and transmit the response to the user interface via the user interface communications handler.

* * * * *